United States Patent
Englert et al.

(10) Patent No.: US 11,411,228 B2
(45) Date of Patent: Aug. 9, 2022

(54) HEAT EXCHANGER FOR A COOLING CIRCUIT

(71) Applicant: Mahle International GmbH, Stuttgart (DE)

(72) Inventors: Peter Englert, Bad Friedrichshall (DE); Oliver Mamber, Sersheim (DE)

(73) Assignee: Mahle International GmbH

( * ) Notice: Subject to any disclaimer, the term of this patent is extended or adjusted under 35 U.S.C. 154(b) by 0 days.

(21) Appl. No.: 17/112,958

(22) Filed: Dec. 4, 2020

(65) Prior Publication Data

US 2021/0175523 A1    Jun. 10, 2021

(30) Foreign Application Priority Data

Dec. 5, 2019   (DE) .......................... 102019219011.1

(51) Int. Cl.
| | |
|---|---|
| *H01M 8/04* | (2016.01) |
| *H01M 8/04029* | (2016.01) |
| *H01M 8/04044* | (2016.01) |
| *H01M 8/04007* | (2016.01) |

(52) U.S. Cl.
CPC ... *H01M 8/04029* (2013.01); *H01M 8/04044* (2013.01); *H01M 8/04067* (2013.01)

(58) Field of Classification Search
CPC ......... H01M 8/04029; H01M 8/04044; H01M 8/04067
See application file for complete search history.

(56) References Cited

U.S. PATENT DOCUMENTS

| | | | |
|---|---|---|---|
| 7,976,998 B2 | 7/2011 | Kormann et al. | |
| 2007/0289732 A1* | 12/2007 | Pillion | F28F 27/00 165/289 |
| 2016/0308226 A1* | 10/2016 | Behrendt | H01M 8/04044 |
| 2018/0305820 A1 | 10/2018 | Englert et al. | |

FOREIGN PATENT DOCUMENTS

| | | |
|---|---|---|
| DE | 4446253 A1 | 6/1996 |
| DE | 101 04 771 A1 | 8/2002 |
| DE | 102012001194 A1 | 7/2013 |
| DE | 10 2013 020 787 A1 | 6/2015 |
| DE | 10 2015 206 633 A1 | 10/2016 |
| DE | 10 2017 206 940 A1 | 10/2018 |

OTHER PUBLICATIONS

English abstract for DE-102012001194.
English abstract for DE-10 2013 020 787.

* cited by examiner

*Primary Examiner* — Olatunji A Godo
(74) *Attorney, Agent, or Firm* — Fishman Stewart PLLC

(57) ABSTRACT

A heat exchanger for a cooling circuit which is flowed through by an aqueous temperature-control fluid may include at least two channel bodies, through which a flow path of the temperature-control fluid leads; at least one tank, which has a base and through which the flow path leads; and at least one ion exchange structure having ion-exchanging fibres for reducing ions in the temperature-control fluid. The at least two channel bodies may be fluidically connected with the at least one tank on a longitudinal end side via the base of the at least one tank.

20 Claims, 1 Drawing Sheet

HEAT EXCHANGER FOR A COOLING CIRCUIT

CROSS-REFERENCE TO RELATED APPLICATIONS

This application claims priority to German Patent Application No. DE 10 2019 219 011.1, filed on Dec. 5, 2019, the contents of which is hereby incorporated by reference in its entirety.

TECHNICAL FIELD

The present invention relates to a heat exchanger for a cooling circuit which is flowed through by an aqueous temperature-control fluid. The invention relates furthermore to a system with such a heat exchanger and with a cooling circuit and a fuel cell.

BACKGROUND

Heat exchangers are used for the temperature controlling of a temperature-control fluid, in particular of aqueous temperature-control fluids, such as coolants for example. In an associated system, the temperature-control fluid, which is temperature-controlled with the heat exchanger, in particular the cooled temperature-control fluid, is used for cooling an application which is usually integrated in a cooling circuit in addition to the heat exchanger.

If the application is an electrical application which requires or generates high amounts of electricity in operation, or if the heat exchanger or respectively the cooling circuit is arranged in the vicinity of such an application, the temperature-control fluid must not exceed a predetermined electrical conductivity, for safety reasons. Here, in particular, the use of the heat exchanger or respectively of the cooling circuit in an at least partially electrically operated motor vehicle is to be considered, in which the application can be, in particular, a fuel cell or a fuel cell stack.

For thermodynamic reasons and for weight reduction, such heat exchangers are usually produced at least partially from a metal or from a metal alloy, for example from aluminium. Accordingly, the temperature-control fluid comes in contact, in operation, with the components directing the temperature-control fluid. Here, in operation, ions, particles and suchlike can become detached and can mix into the temperature-control fluid and thus lead to an increase of an initial electrical conductivity of the temperature-control fluid, which lies above a permitted threshold value of the electrical conductivity.

In order to counteract this, it is known, for example from DE 10 2017 206 940 A1, to passivate the surfaces of the heat exchanger which are in contact with the temperature-control fluid.

Such heat exchangers are generally composed through materially bonded connection techniques, in particular by soldering. Here, corresponding connection means or means promoting the connections, such as for example fluxing agents, are used. In operation of the heat exchanger, the heat exchanger can emit residues of these connection means or auxiliary agents into the temperature-control fluid. If the emitted residues are ions, then this leads to an increase of the electrical conductivity of the temperature-control fluid, which is to be avoided or at least reduced.

Furthermore, residues of passivating agent can also become detached in operation and/or can arrive into the temperature-control fluid. If ions are concerned here, this leads to an increase of the electrical conductivity of the temperature-control fluid.

In order to remove ions from the temperature-control fluid in operation, various methods are known.

In DE 10 2013 020 787 A1 it is proposed to arrange an ion exchange resin in a bypass channel of an associated cooling circuit, and to allow the temperature-control fluid to then flow through the bypass and thus through the ion exchange resin, when the temperature-control fluid does not exceed a predetermined temperature.

From DE 101 04 771 A1 a method is known for the electrochemical deionization of a temperature-control fluid in a cooling circuit.

DE 10 2015 206 633 A1 proposes the use of a processing unit with a layer system for the deionizing of the temperature-control fluid, which is integrated as a separate structural unit into the cooling circuit and is composed of several ion-exchanging layers. For the operation of the processing unit, an optical sensor is necessary here for the colour spectral analysis of the layer system.

A disadvantage in the methods known from the prior art for the reducing of ions are the complex structure and the laborious operation.

SUMMARY

The present invention is therefore concerned with the problem of indicating, for a heat exchanger of the type named in the introduction and for a system with such a heat exchanger, improved or at least different embodiments, which in particular are distinguished by a simple and efficient reduction of ions in an aqueous temperature-control fluid flowing through the heat exchanger.

This problem is solved according to the invention by the subject matter of the independent claim(s). Advantageous embodiments are the subject matter of the dependent claim(s).

The present invention is based on the general idea of arranging, in a heat exchanger for a cooling circuit which is flowed through by an aqueous temperature-control fluid, an ion exchanger for the reducing of ions in the temperature-control fluid, and of providing the ion exchanger as an ion exchange structure which has ion-exchanging fibres. The arrangement of the ion exchange structure in the heat exchanger leads to the reducing of ions taking place within the heat exchanger and therefore where the temperature-control fluid has increased temperatures and where it can thus lead to an increased occurrence of ions. In particular, the removing of ions takes place in an associated system or cooling circuit within the heat exchanger and thus where increased temperatures, in particular the highest temperatures, prevail in the cooling circuit. Consequently, an effective and/or needs-based removing or at least reducing of the ions from the temperature-control fluid is achieved. In addition, in this way it is prevented that ions flow out from the heat exchanger with the temperature-control fluid and thus lead to an increase of the electrical conductivity of the temperature-control fluid or the corresponding risk is at least reduced. In this way, risks accompanying the increase of the electrical conductivity for subsequent and/or adjacent applications, in particular those which require and/or generate high amounts of electricity, are prevented or at least reduced. The ion-exchanging fibres of the ion exchange structure furthermore allow the removing of ions from the temperature-control fluid in the entire operating temperature range of the temperature-control fluid, so that an effective and reliable removing of ions form the temperature-control fluid takes place. In addition, the use of the ion-exchanging fibres leads to a reducing of the pressure loss in the temperature-control fluid, so that the heat exchanger and/or the associated cooling circuit and/or the associated system can be operated more efficiently.

In accordance with the idea of the invention, the heat exchanger has at least two channel bodies, through which a flow path of the temperature-control fluid leads. The heat exchanger has, furthermore, at least one tank. The respective tank can serve for the collecting of the temperature-control fluid from the channel bodies or respectively for the distributing of the temperature-control fluid in the channel bodies. Accordingly, the flow path of the temperature-control fluid leads through the tank. This means in particular that, in operation, the temperature-control fluid flows through the channel bodies and the at least one tank. The tank has here a base via which the channel bodies are fluidically connected with the tank. In particular, the channel bodies are received on the longitudinal end side in the base. According to the invention, at least one ion exchange structure for the reducing of ions in the temperature fluid, which has ion-exchanging fibres, is arranged in the heat exchanger.

The reducing of ions in the temperature-control fluid means here in particular that the concentration of ions in the temperature-control fluid is reduced through an interaction with the ion exchange structure. This takes place in particular with the ion-exchanging fibres of the ion exchange structure.

The components of the heat exchanger, in particular of the at least one tank and the at least two channel bodies, can basically be produced from any desired materials. Preferably, the channel bodies and/or the at least one tank are produced from a metal or from a metal alloy, for example from aluminium or from an aluminium alloy. The increased thermal conductivity of these materials leads to a more efficient heat transfer between the temperature-control fluid and the components and thus to a more efficient temperature control of the temperature-control fluid, i.e. in particular to a more efficient cooling or heating of the temperature-control fluid.

It is advantageous here if at least one of the channel bodies and/or at least one of the at least one tanks is passivated on the areas, also designated below as surfaces, which are in contact with the temperature-control fluid in operation.

With the heat exchanger a temperature control takes place, i.e. a cooling and/or a heating of the temperature-control fluid, which is subsequently used accordingly for the temperature control of a further application. In particular, with the heat exchanger a cooling of the temperature-control fluid takes place, which thus cools the subsequent application.

Embodiments are preferred, in which at least one of the at least one ion exchange structures is arranged in the tank of the heat exchanger. As the tank usually has a greater volume than the channel bodies, it is possible in this way to form the ion exchange structure to be larger and consequently to achieve a more efficient reducing of ions in the temperature-control fluid and/or to reduce the pressure loss in the temperature-control fluid.

Embodiments are preferred, in which at least one of the at least one ion exchange structures is able to be flowed through by the temperature-control fluid and is arranged in the flow path. This means in particular that the ion exchange structure is flowed through, in operation, by the temperature-control fluid. In particular, the fibres of the ion exchange structure are arranged in the flow path and are flowed through, in operation, by the temperature-control fluid. As consequently the area of the ion exchange structure which is in contact with the temperature-control fluid is enlarged, an improved reducing of ions in the temperature-control fluid takes place. At the same time, the fibres of the ion exchange structure lead to a reduction or delimitation of the pressure loss in the temperature-control fluid, caused by the ion exchange structure.

Embodiments are preferred, in which at least one of the at least one ion exchange structures has both such fibres which reduce cations in the temperature-control fluid, also designated below as cation-exchanging fibres, and also fibres which reduce anions in the temperature-control fluid, also designated below as anion-exchanging fibres. The use of the fibres in the ion exchange structure allows both types of fibres to be arranged easily and at a favourable cost in the ion exchange structure, and/or to reduce the pressure loss in the temperature-control fluid caused by the ion exchange structure.

It is conceivable to combine at least one of the at least one ion exchange structures together with a filter medium for the removing of particles from the temperature-control fluid to form a filter body which is arranged in the heat exchanger. Thus with the filter body, in operation, both particles are removed from the temperature-control fluid and also ions in the temperature-control fluid are reduced. In particular, it is possible in this way to allow the temperature-control fluid to flow through the filter medium before the reducing of ions. This leads to particles which are present in the temperature-control fluid not reaching the ion exchange structure, or at least reaching it to a reduced extent. Consequently, the covering or disturbing of the fibres by such particles is prevented or at least reduced. Accordingly, in this way the efficiency and the lifespan of the ion exchange structure is improved.

The respective ion exchange structure can basically be produced in any desired manner, in so far as the ion exchange structure has the ion-exchanging fibres. In particular, the production is conceivable in the manner of cellulose shaped bodies by the dry-wet extrusion method, by forming a cellulosic solution in an aqueous tertiary amine oxide and the extruding of the solution and the moving of the extrudate in a non-precipitating medium, and the precipitating of the shaped bodies In an aqueous precipitation bath, wherein the solution has at least one ion exchanger with a particle size which is in particular less than 100 $\Box$m.

Embodiments are preferred, in which the fibres at least of one of the at least one ion structures interact in the manner of a textile. The textile-like interacting leads to a favourable through-flowability of the ion exchange structure and thus to reduced pressure losses in the temperature-control fluid. In addition, the fibres can thus at least partially form the form and structure of the ion exchange structure, can therefore at least partially shape the ion exchange structure. This means in particular that the fibres prescribe or at least influence the form of the ion exchange structure through their arrangement and/or connection and/or course. At least one of the at least one ion exchange structures can be composed here of the ion-exchanging fibres.

It is conceivable here that the fibres at least of one of the at least one ion exchange structures form a non-woven fabric. The ion exchange structure therefore has an ion exchange non-woven fabric or is formed as such a non-woven fabric.

Embodiments are advantageous in which in the case of at least one of the at least one ion exchange structures the fibres cross one another and/or intertwine. In particular, the fibres are woven and thus form a woven fabric. Embodiments are also conceivable in which the fibres form a warp-knitted fabric, a knit, a mesh and suchlike.

It is conceivable that in the case of at least one of the at least one filter bodies, the fibres of the ion exchange structure and fibres of the filter medium, also designated below as filter fibres, likewise interact in the manner of a textile. This means in particular that the fibres of the ion exchange structure and the filter fibres of the filter medium cross one another and/or intertwine, in particular are woven.

The respective ion exchange structure can basically be formed in any desired manner.

Embodiments are advantageous, in which at least one of the at least one ion exchange structures has a hollow-cylindrical shape. This leads to an improved through-flowability of the ion exchange structure so that the pressure reduction in the temperature-control fluid, caused by the ion exchange structure, is reduced.

Preferably, at least one of the at least one hollow-cylindrical ion exchange structures is arranged in the heat exchanger in such a way that the flow path leads through an outer surface of the ion exchange structure. This means in particular that, in operation, the outer surface is flowed through by the temperature-control fluid, so that the temperature-control fluid flows into the interior of the ion exchange structure. This leads to an effective reduction of ions in the temperature-control fluid and, at the same time, to a reduction of the pressure losses in the temperature-control fluid caused by the ion exchange structure. Here, the outer surface can be flowed through transversely in operation, therefore the flow path can lead transversely to the outer surface into the interior of the ion exchange structure.

The heat exchanger is in particular a component part of a cooling circuit, through which the temperature-control fluid flows, in particular circulates.

The heat exchanger and the associated cooling circuit can basically be used in any desired application, in particular the temperature control, for example the cooling, of any desired application.

In an associated system, the temperature-control fluid circulates, in operation, through the cooling circuit. Here, the heat exchanger is integrated in the cooling circuit, so that the heat exchanger, in operation, is flowed through by the temperature-control fluid. In other words, the flow path of the temperature-control fluid leads in a circulating manner through the cooling circuit and runs through the heat exchanger.

In the system in addition an application is integrated in such a way that this application is temperature-controlled, in particular cooled, with the temperature-control fluid. The application concerns in particular one which is operated electrically and/or stores and/or generates electrical energy. In particular, the application can concern an electric motor and/or an electric energy store.

In addition, embodiments are to be considered, in which the application is a fuel cell or a fuel cell stack, which is integrated in the cooling circuit in such a way that the fuel cell, in operation, is temperature-controlled, in particular cooled, by the temperature-control fluid. In such an application, it is particularly important to keep the electrical conductivity of the temperature-control fluid low. Accordingly, the heat exchanger according to the invention is particularly suitable for such systems in which the fuel cell is temperature-controlled, in particular cooled, with the heat exchanger in the cooling circuit.

In the case of a fuel cell or respectively a fuel cell stack, the temperature-control fluid can come in contact here with component parts of the fuel cells, for example with a bipolar plate, wherein the bipolar plate, in operation, can emit ions into the temperature-control fluid, which are again reduced with the at least one ion exchange structure in the heat exchanger in the temperature-control fluid.

It is preferred if component parts directing temperature-control fluid in the system, in particular of the cooling circuit and/or of the heat exchanger, are passivated at their surfaces directing the temperature-control fluid. In particular here fluidic lines of the cooling circuit, such as for example pipes, tubes and suchlike are passivated on the surfaces. Likewise, it is conceivable that a conveying device, for example a pump is passivated for conveying the temperature-control fluid on the surfaces.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments are illustrated in the drawings and are explained more closely in the following description, wherein the same reference numbers refer to identical or similar or functionally identical components.

BRIEF DESCRIPTION OF THE DRAWINGS

There are shown, respectively schematically

DETAILED DESCRIPTION

Figure 1:
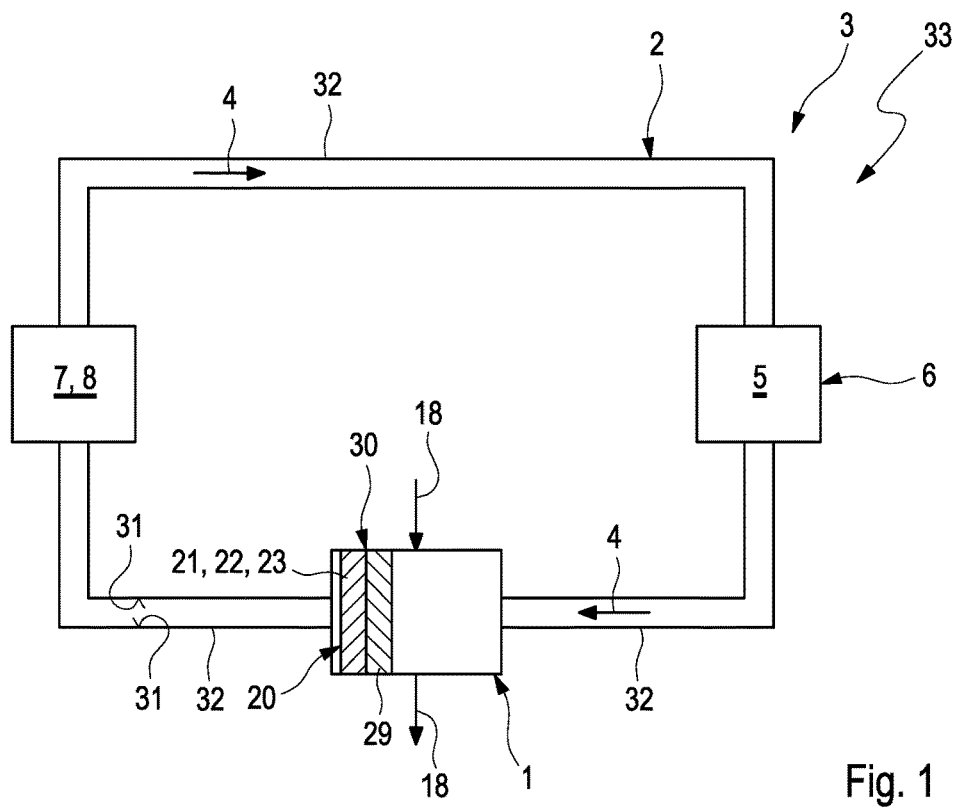
FIG. 1 shows a highly simplified, circuit plan-like illustration of a system with a heat exchanger.
Figure 2:
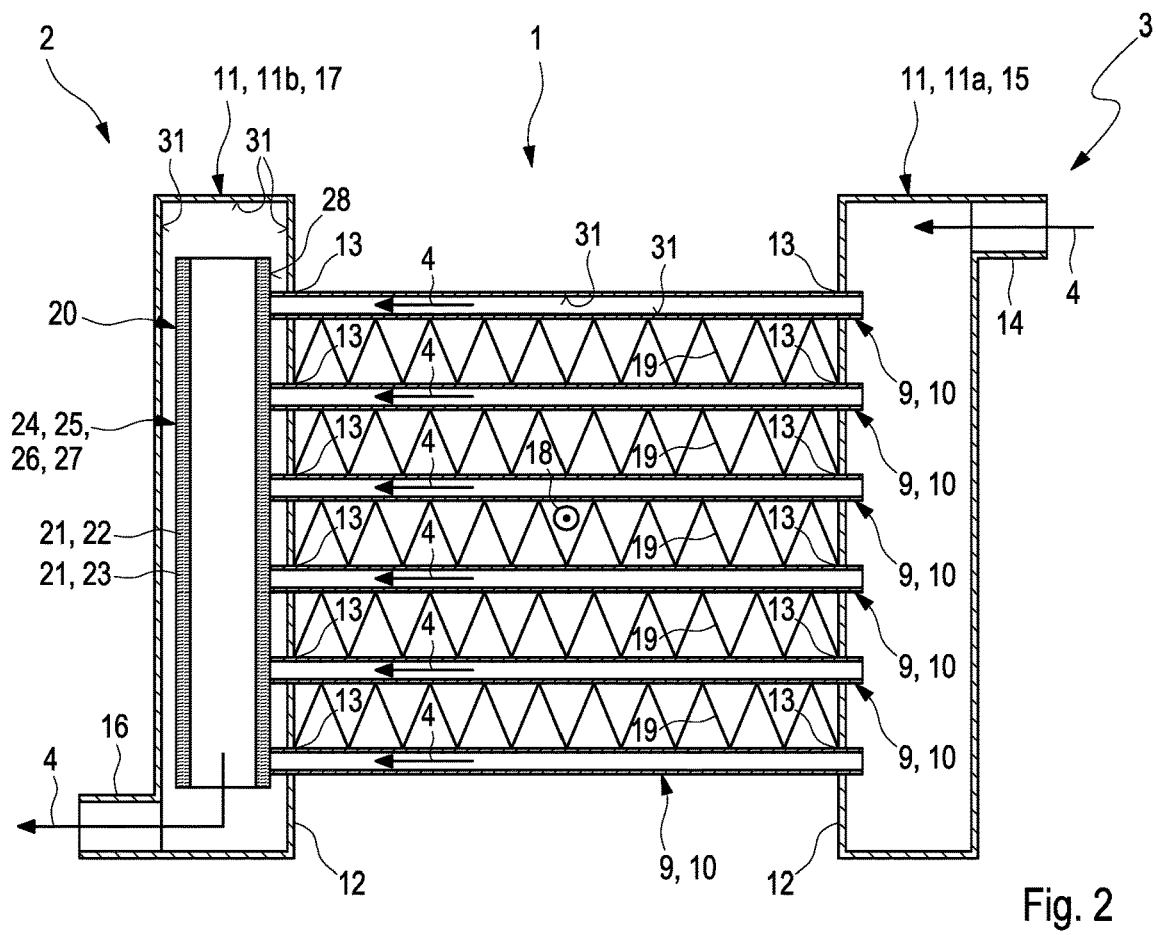
FIG. 2 shows a section through the heat exchanger in another example embodiment.

A heat exchanger 1, as is shown for example in FIGS. 1 and 2, is used in a cooling circuit 2, as is shown by way of example in FIG. 1, wherein the cooling circuit 2 in FIG. 1 is a component part of a system 3. The heat exchanger 1, in particular the cooling circuit 2 and/or the system 3, are used here for example in a motor vehicle 33. The heat exchanger 1 is integrated in the cooling circuit 2. Here, a flow path 4 of a temperature-control fluid runs through the cooling circuit 2 and through the heat exchanger 1 in such a way that the temperature-control fluid circulates through the cooling circuit 2 and flows here through the heat exchanger 1. The temperature-control fluid concerns here in particular one which is water-based. In the example shown in FIG. 1, the system 3 has, furthermore, a fuel cell 5, which can be a component part of a fuel cell stack 6, which is likewise integrated in the cooling circuit 2. Here, the temperature-control fluid is temperature-controlled, in particular cooled, with the heat exchanger 1, in order to subsequently temperature-control, in particular cool, the fuel cell 5. The system 3, in particular the cooling circuit 2, can have further component parts, such as for example a conveying device 7, in particular a pump 8, for the conveying of the temperature-control fluid through the cooling circuit 2.

According to FIG. 2, the heat exchanger 1 has at least two channel bodies 9, for example tubular bodies 10, through which the flow path 4 of the temperature-control fluid leads. The heat exchanger 1 has, furthermore, at least one tank 11, through which the flow path 4 also leads and which, in operation, is thus likewise flowed through by the temperature-control fluid. The tank 11 has here a base 12 in which the channel bodies 9 are received on the longitudinal end side and thus connected fluidically with the tank 11. For this purpose, an associated mount 13 is formed in the base 12 for the respective channel body 9. In the example embodiment which is shown, the heat exchanger 1 has two such tanks 11, which are arranged lying opposite along the extent of the channel bodies 9, wherein the channel bodies 9 are received on the longitudinal end side in the base 12 of the respective tank 11. Here, the upstream tank 11 with respect to the flow path 4 of the temperature-control fluid, also designated below as first tank 11a, serves for the distributing of the temperature-control fluid which in the example embodiment shown flows via an inlet connection 14 into the first tank 11a, into the channel bodies 9. The first tank 11a therefore concerns in particular a distributor box 15 of the heat exchanger 1. With the other tank 11, also designated below as second tank 11b, the temperature-control fluid flowing out of the channel bodies 9 is collected and flows, in the example shown, via an outlet connection 16, out of the second tank 11b. The second tank 11b therefore concerns in particular a collector box 17 of the heat exchanger 1. For the temperature control of the temperature-control fluid, in the example embodiment shown the channel bodies 9 are arranged in a temperature-control path 18 which is separated from the flow path 4 of the temperature-control fluid, in such a way that a fluid which is different from the temperature-control fluid, for example air, flows between the channel bodies 9. Therefore, heat is transferred via the channel bodies 9 between the temperature-control fluid and the other fluid, in particular the temperature-control fluid is cooled. In the example embodiment shown in FIG. 2, ribs 19, enlarging the heat-transferring area, are arranged here between adjacent channel bodies 9.

The respective tank 11 and the channel bodies 9, advantageously also the ribs 19, are preferably produced from a metal, for example from aluminium, or from a metal alloy, for example an aluminium alloy and are soldered to one another.

In the heat exchanger 1 an ion exchange structure 20 is arranged, which serves for the reducing of ions in the temperature-control fluid. The ion exchange structure 20 has ion-exchanging fibres 21, preferably both cation-exchanging fibres 22 and also anion-exchanging fibres 23, for the reducing of ions in the temperature-control fluid. The fibres 21 interact here in the manner of a textile 24, form in particular a non-woven fabric 25, a woven fabric 26, a warp-knitted fabric 27 or mixtures thereof.

In the example embodiment shown in FIG. 2, only one such ion exchange structure 20 is provided. Here, the ion exchange structure 20 is arranged in one of the tanks 11, in the example which is shown in the second tank 11b or respectively in the collection box 17. The ion exchange structure 20 has here a hollow-cylindrical shape. The ion exchange structure 20 is arranged in the tank 11 in such a way that the flow path 4 of the temperature-control fluid leads through an outer surface 28 of the hollow-cylindrical ion exchange structure 20, so that the temperature-control fluid flows, in operation, through the outer surface 28 into the interior of the hollow-cylindrical ion exchange structure 20.

The example embodiment of the heat exchanger 1, shown in FIG. 1, differs from the example embodiment shown in FIG. 1 in that in addition to the ion exchange structure 20, which can correspond to the ion exchange structure 20 of the heat exchanger 1 of FIG. 2, a filter medium 29 is provided for the filtering of particles from the temperature-control fluid. The filter medium 29 and the ion exchange structure 20 form here together a filter body 30. In a variant which is not shown, it is conceivable that the fibres 21 of the ion exchange structure 20 interact with filter fibres, which are not shown, of the filter medium 29 in the manner of a textile.

The component parts of the cooling circuit 2, in particular of the entire system 3 which, in operation, come in contact with the temperature-control fluid which lead in particular the temperature-control fluid, are passivated at their surfaces 31 coming into contact with the temperature-control fluid. This applies preferably both for the heat exchanger 1 and also for the conveying device 7 and preferably also for the fuel cell 5 or respectively the fuel cell stack 6. This likewise applies for the surfaces 31 of lines 32 of the cooling circuit 2 directing temperature-control fluid.

The invention claimed is:

1. A heat exchanger for a cooling circuit which is flowed through by an aqueous temperature-control fluid, comprising:
   at least two channel bodies, through which a flow path of the temperature-control fluid leads;
   a tank having a base and through which the flow path leads; and
   an ion exchange structure having ion-exchanging fibres for reducing ions in the temperature-control fluid, the ion exchange structure is disposed within the tank;
   wherein the at least two channel bodies are fluidically connected with the tank on a longitudinal end side via the base of the tank.

2. The heat exchanger according to claim 1, including an additional tank spaced apart from and fluidically connected with the tank;
   wherein the channel bodies are disposed between the additional tank and the tank; and
   wherein the channel bodies are arranged parallel to one another.

3. The heat exchanger according to claim 1, wherein the ion exchange structure is configured to be flowed through by the temperature-control fluid and is arranged in the flow path.

4. The heat exchanger according to claim 1, wherein the ion exchange structure has cation-exchanging fibres and anion-exchanging fibres.

5. The heat exchanger according to claim 1, wherein the ion exchange structure forms, together with a filter medium for removing of particles from the temperature-control fluid, a filter body.

6. The heat exchanger according to claim 1, wherein the fibres of the ion exchange structure interact in a manner of a textile.

7. The heat exchanger according to claim 6, wherein the ion exchange structure has a non-woven fabric formed from the fibres.

8. The heat exchanger according to claim 6, wherein, in the case of the ion exchange structure, the fibres at least one of (i) cross one another, and (ii) intertwine with one another.

9. The heat exchanger according to claim 5, wherein, in the filter body, fibres of the ion exchange structure and filter fibres of the filter medium at least one of (i) cross one another, and (ii) intertwine with one another.

10. The heat exchanger according to claim 1, wherein the ion exchange structure has a hollow-cylindrical shape.

11. The heat exchanger according to claim 3, wherein the ion exchange structure has a hollow-cylindrical shape and is arranged in the heat exchanger in such a way that the flow path runs through an outer surface of the ion exchange structure.

12. A system, comprising:
a cooling circuit in which, in operation, an aqueous temperature-control fluid circulates;
a fuel cell, which is integrated in the cooling circuit in such a way that the fuel cell, in operation, is temperature-controlled by the temperature-control fluid; and
a heat exchanger for temperature-controlling the temperature-control fluid, which is integrated in the cooling circuit and, in operation, is flowed through by the temperature-control fluid, the heat exchanger including:
at least two channel bodies, through which a flow path of the temperature-control fluid leads;
a tank, which has a base and through which the flow path leads; and
an ion exchange structure having ion-exchanging fibres for reducing ions in the temperature-control fluid, the ion exchange structure is arranged within the tank;
wherein the at least two channel bodies are fluidically connected with the tank on a longitudinal end side via the base of the tank.

13. The system according to claim 12, wherein component parts, directing temperature-control fluid, of the system are passivated at their temperature-control fluid-directing surfaces.

14. The system according to claim 12, including:
an additional tank spaced apart from and fluidically connected with the tank; and
an additional ion exchange structure disposed within the additional tank.

15. The system according to claim 12, wherein the ion exchange structure is configured to be flowed through by the temperature-control fluid and is arranged in the flow path.

16. The system according to claim 12, wherein the ion exchange structure has cation-exchanging fibres and anion-exchanging fibres.

17. The system according to claim 12, wherein the ion exchange structure forms, together with a filter medium for removing of particles from the temperature-control fluid, a filter body.

18. The heat exchanger according to claim 8, wherein the fibres are woven together.

19. The heat exchanger according to claim 9, wherein the fibres are woven together.

20. A heat exchanger for a cooling circuit which is flowed through by an aqueous temperature-control fluid, comprising:
at least two channel bodies, through which a flow path of the temperature-control fluid leads;
a first tank, which has a base and through which the flow path leads;
a second tank spaced apart from and fluidically connected with the first tank, the channel bodies are disposed between the first and second tanks; and
a first and a second ion exchange structure having ion-exchanging fibres for reducing ions in the temperature-control fluid, the first ion exchange structure is disposed entirely within the first tank and the second ion exchange structure is disposed entirely within the second tank;
wherein the at least two channel bodies are fluidically connected with the the first and second tanks;
wherein the first and second ion exchange structures each form, together with a filter medium for removing of particles from the temperature-control fluid, a filter body; and
wherein the first and second ion exchange structures have a hollow-cylindrical shape and are arranged in the heat exchanger in such a way that the flow path runs through an outer surface of the first and second ion exchange structures.

* * * * *